United States Patent
Le Goff et al.

(10) Patent No.: US 10,756,595 B2
(45) Date of Patent: Aug. 25, 2020

(54) AIR PULSE DEVICE WITH AN ELECTRIC MOTOR AND ASSOCIATED MOTOR CARRIER WITH SEALING MEANS FOR THE PASSAGE OF MOTOR CONNECTORS

(71) Applicant: Valeo Systemes Thermiques, Le Mesnil Saint Denis (FR)

(72) Inventors: Morgan Le Goff, Le Mesnil Saint-Denis (FR); Geoffroy Capoulun, Le Mesnil Saint-Denis (FR); Emmanuel Rudloff, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 151 days.

(21) Appl. No.: 16/072,031

(22) PCT Filed: Jan. 25, 2017

(86) PCT No.: PCT/FR2017/050163
§ 371 (c)(1),
(2) Date: Jul. 23, 2018

(87) PCT Pub. No.: WO2017/129900
PCT Pub. Date: Aug. 3, 2017

(65) Prior Publication Data
US 2019/0027995 A1  Jan. 24, 2019

(30) Foreign Application Priority Data
Jan. 26, 2016 (FR) .................................... 16 50596

(51) Int. Cl.
*H02K 7/14* (2006.01)
*H05K 5/00* (2006.01)
(Continued)

(52) U.S. Cl.
CPC ............ *H02K 7/14* (2013.01); *B60H 1/00457* (2013.01); *H02K 5/10* (2013.01); *H02K 9/06* (2013.01);
(Continued)

(58) Field of Classification Search
CPC .. H02K 5/10; H02K 5/00; H02K 5/08; H02K 11/33; H02K 11/30; H02K 11/00;
(Continued)

(56) References Cited

U.S. PATENT DOCUMENTS 7,939,978 B2 * 5/2011 Best ...................... H02K 11/33
                                                    310/71
8,212,439 B2 * 7/2012 Dautel .................. H02K 11/33
                                                    310/58
(Continued)

FOREIGN PATENT DOCUMENTS

EP    2214293 A1    8/2010
FR    2 920 491 A1  3/2009

OTHER PUBLICATIONS

International Search Report issued in PCT/FR2017/050163 dated Jun. 8, 2017 (2 pages).
(Continued)

*Primary Examiner* — Angel R Estrada
(74) *Attorney, Agent, or Firm* — Osha Liang LLP

(57) ABSTRACT

The invention relates to an air pulse device (1) suitable for equipping a ventilation, heating and/or air-conditioning system of a motor vehicle. The air pulse device (1) comprises a carrier (4) on which an electric motor (2) equipped with connectors (6) and a control board (5) equipped with contact switches (7) are mounted. A sealing member (13) has openings (14) whereby said sealing member (13) individually grips the end portion (8) of the connectors (6) prior to the engagement thereof with the contact switches (7). The
(Continued)

sealing member (13) has sealing elements (42) inserted between the carrier (4) and the heat sink (11), extending in a transverse direction towards the outside of the channels (12).

17 Claims, 2 Drawing Sheets

(51) Int. Cl.
*H02K 5/10* (2006.01)
*H02K 11/33* (2016.01)
*B60H 1/00* (2006.01)
*H02K 9/06* (2006.01)
*H02K 9/22* (2006.01)
*F04D 25/08* (2006.01)

(52) U.S. Cl.
CPC ............... *H02K 9/22* (2013.01); *H02K 11/33* (2016.01); *F04D 25/082* (2013.01)

(58) Field of Classification Search
CPC .. H02K 7/14; H02K 9/06; H02K 9/22; H02K 9/00; B60H 1/00457; F04D 25/082
USPC .......... 174/50, 59, 520, 539; 310/43, 10, 89, 310/88, 91, 254.1; 436/76.1, 76.2
See application file for complete search history.

(56) References Cited

U.S. PATENT DOCUMENTS 8,415,846 B2 *   4/2013  Best .................... H02K 5/10
                                                        310/43
8,946,957 B2 *   2/2015  Baumann ............ H02K 5/225
                                                        174/59
9,997,973 B2 *   6/2018  Muller .................. H02K 9/02

OTHER PUBLICATIONS

Written Opinion of the International Searching Authority issued in PCT/FR2017/050163 dated Jun. 8, 2017 (6 pages).

* cited by examiner (a) (b)

AIR PULSE DEVICE WITH AN ELECTRIC MOTOR AND ASSOCIATED MOTOR CARRIER WITH SEALING MEANS FOR THE PASSAGE OF MOTOR CONNECTORS

The present invention relates to the field of air blowing devices with which motor vehicle heating, ventilation and/or air conditioning installations are notably equipped. The present invention relates more particularly to the means of connection between an electric motor and an electronic control board that regulates the operation of the motor that such air blowing devices comprise.

Heating, ventilation and/or air conditioning installations with which motor vehicles are equipped comprise one or more air circulation ducts and are equipped with at least one air blowing device in order to generate a flow of air through the installation. Such an air blowing device comprises an electric motor driving the rotation of, in particular, an impeller or wheel and a control means regulating the operation of the motor. The motor, which comprises a rotor and a stator, is mounted on a support for installing the air blowing device on a wall of the installation.

The wheel is therefore placed inside a duct of the installation to generate the flow of air therethrough. The control means provides the supply of electrical current for the motor and controls the rotational speed thereof, notably by varying the electric current. Control over the operation of the motor makes it possible to regulate the rotational speed of the wheel and, as a result, regulate aerodynamic characteristics of the flow of air circulating through the installation.

It is known practice to install the control means near the motor. To do that, an electronic control board is mounted on the support. Such a control board is formed in the conventional way of an electrically insulating card comprising electrically conducting tracks and equipped with electronic components.

A heatsink is preferably interposed between the control board and the support, to dissipate the heat produced by the electronic components with which the control board is equipped.

The motor and the control board are then respectively positioned on opposite faces of the support used for installing the device. Electrical connection between the motor and the control board is afforded by bringing the free end of the connectors with which the motor is equipped into contact with contactors with which the control board is equipped. The connectors are commonly arranged as metal tabs extending from the motor toward the control board, notably parallel to the axis of rotation of the motor. The contactors are commonly formed of metal tabs formed on the opposite face of the control board to the face used for installing it on the support. The contactors are fixed to the control board and comprise a flexible tab for bringing them into contact with the connectors.

The free end of each of the connectors therefore passes in succession through the support, the heatsink and then the control board. To do that, passages for the connectors toward the contactors are respectively formed through the support, through the heatsink where appropriate, and then through the control board. The connectors are introduced through said passages and emerge beyond the control board to be placed in contact with the contactors and electrically connect the motor and the control board.

In this context, it should be taken into consideration the fact that the wheel, and possibly also the motor, are placed inside a duct of the installation and that the flow of air conveyed through the duct is potentially damp. As a result, dampness or even water droplets coming from the motor may infiltrate toward the control board through the connector passages formed in the support. In order to protect the control board from a potential ingress of water which could flow across the support, one known solution is to interpose a sealing member between the motor and the support.

The sealing member comprises openings to form a passage for the connectors therethrough, in the continuation of the passages formed in the support. Once the connectors have been introduced through the openings, the sealing member tightly clamps the connectors, in order to act as an obstacle to the passage of dampness.

It has been found in practice that the means for sealing against the ingress of dampness toward the control board needs to be improved bearing in mind various constraints, notably economical constrains and constraints with regard to available space. More specifically, one constraint lies in the fact that the objective is for the air blowing device to be as compact as possible, at least in the direction in which the connectors extend, in order to make it easier to install on the installation.

In the context of connectors formed of significantly extensive metal blades, improvement of the sealing means is sought. The significant extensiveness of the connectors makes them flexible and therefore subject to deformation, at least in the direction in which their terminal part extends. Such deformation of the connectors is liable to be caused by individual handlings of the motor, prior to or subsequent to it being mounted on the support, and/or brought about more specifically as they are introduced into the passages formed notably through the support.

In addition, the metallic nature of the connectors makes them cutting, with the consequence of inducing a risk of damaging the sealing member as the connectors are introduced through it. The damage caused by the connectors to the sealing member may subsequently affect the protection afforded to the control board with respect to ingress of dampness.

In this context, the present invention aims to seek solutions that make it possible to certify that the infiltration of dampness from the motor and the support toward the control board following introduction of the connectors through the sealing member can be certified as being prevented.

Thus, according to the present invention, the air blowing device is of the type arranged as being able to equip a motor vehicle heating, ventilation and/or air conditioning installation.

Such an air blowing device comprises a support on which are installed an electric motor, notably for driving a wheel, and an electronic control board that regulates the operation of the motor.

The motor is preferably an electromagnetic motor the stator of which is provided with connectors, for example three of these in the case of a three-phase motor, it being understood that this number may vary without departing from the context of the invention. The electronic board is notably formed of an electrically insulating card comprising electrically conducting tracks and equipped with electronic components. The regulation of the operation of the engine by the control board is advantageously afforded by varying the electric current transmitted by the control board to power the motor with powering electrical energy.

The motor is equipped with elongate connectors extending for example parallel to the axis of rotation of the motor. The connectors more particularly extend from their proximal end of connecting to the stator toward their distal end of being brought into contact with contactors with which the control board is equipped. A terminal part of the connectors passes through the support along respective canals. The distal ends of the connectors collaborate with respective contactors with which the control board is equipped, in order to provide the electrical connection between the motor and the control board and, as a result, to bring the distal end of the connectors and the contactors into contact. The distal end of a connector is understood as meaning that end of the connectors that is placed in contact with the contactors and therefore arranged at the opposite end to the proximal end of the connectors which is secured to one phase of the motor.

The support is equipped with at least one sealing member individually clamping the terminal part of the connectors. The sealing member is notably derived from an elastomer material giving it a flexibility that allows it to clamp the connectors after they pass through the sealing member. The connectors pass through the sealing member along respective openings formed in the continuation of the canals formed through the support. Said openings thus create respective passages for the connectors through the sealing member, which then grip them as a result of elastic deformations thereof.

A heatsink is interposed between the support and the control board. Such a heat exchanger is dedicated to cooling the control board. The heatsink comprises respective lanes for the passage of the connectors through it. Such lanes are formed in the continuation of the canals and of the openings. Thus, the connectors pass through the support along the canals and the sealing member through the openings, then pass through the heatsink through the lanes to extend toward the contactors. The distal end of the connectors is therefore placed in contact with the contactors in order to electrically connect the motor to the control board.

In this context, the air blowing device of the present invention is chiefly recognizable in that the sealing member comprises sealing elements interposed between the support and the heatsink, in the outward transverse continuation of the canals. The idea of transverse is of course understood relative to the idea of extension of the canal or, in other words, relatively with respect to the direction of extension of the connectors or alternatively relative to the direction in which the connectors are introduced through the canals.

Thus, sealing is afforded not only between the connector and the support but also directly between the support and the heatsink. Any potential dampness is thus prevented from passing toward the control board, either dampness flowing along the connectors or dampness surrounding the support.

The structural organization of the support and/or of the heatsink have to be taken into consideration, particularly with regard to the respective layouts of their faces facing one another. Specifically, such potentially complex arrangements make the interposition of a flat seal extending over all of the respective surfaces of the faces of the support and of the heatsink tricky.

This is why it should be noted that the sealing elements are carefully formed in spaces limited to the close environment of the canals. Thus, the sealing elements can be simple in structure and limited in size. Furthermore, the choice to install the sealing elements on the support in the environment of the canals allows the control board to be spared effectively and inexpensively from any moisture, either coming from the motor or coming from the external environment of the support. Such lower costs are obtained by simplifying the structure of the sealing elements as a result of their being interposed between the support and the heatsink in a space that is restricted to their open ends in the continuation of one another.

As a result, another advantage is afforded for simplifying the means of sealing that protect the control board from any moisture coming from the motor and/or from the environment of the support. Specifically, arranging the sealing elements at the distal openings of the canals allows the sealing means interposed between the canals and the connectors with the sealing means interposed between the support and the heatsink to be shared in common. This yet again results in further simplification of the structural arrangement specific to the sealing elements and to a reduction in the costs associated with obtaining them.

To this end, the sealing means interposed between the support and the connectors may advantageously be put to use to form the sealing elements. More specifically, the sealing elements are preferably respectively formed at the distal openings of the canals oriented toward the heatsink, each being provided with one said opening.

As a result, one and the same sealing means that makes up the sealing member can be used to afford, on the one hand, sealing between the connectors and the support and, on the other hand, sealing between the support and the heatsink. As a result, the overall organization of the sealing means sparing the control board from moisture is thereby simplified.

It is desirable to restrict the extension of the assembly formed by the support, the sealing member and the heatsink in the direction of insertion of the connectors into the canals. To do this, the heatsink advantageously comprises respective housings for accepting sockets incorporated into the support and extending as projections out toward the control board. In that context, the openings of the sockets respectively create the canals. As a result of their being introduced into the housings, the sockets open respectively onto the lanes formed through the heatsink.

To that end, the bottom of the housings is open to the distal face of the exchanger oriented toward the control board, creating the lanes. The openings formed in the bottom of the housings are spared from any moisture by the sealing afforded between the canals and the connectors, and between the support and the heatsink by means of the sealing elements.

According to one form of embodiment, the sealing elements are preferably interposed in compression between the exterior wall of the sockets and the wall of the heatsink delimiting the housings, as a result of the introduction of the sockets into the housings. The sealing thus afforded between the support and the heatsink is particularly effective.

The housings are preferably widened toward their proximal opening directed toward the support. In this way, the housings advantageously form ramps progressively compressing the sealing elements between the exterior wall of the sockets and the wall of the heatsink delimiting the housings.

More particularly, the sealing elements are arranged as fins derived from an elastomer material. Such fins are advantageously flexible so as to allow them to be compressed between the sockets and the housings as a result of the one being plugged into the other causing the fins positioned interposed between them to bend over.

The fins notably extend toward the outside of the canals, transversely to the direction of insertion of the connectors into the canals. As a result of the insertion of the sockets into the housings, such fins may be pushed over longitudinally against the exterior walls of the sockets in the direction of insertion of the connectors into the canals. As a result, the fins find themselves compressed between the sockets and the walls of the exchanger delimiting the housings along a significant expanse affording effective sealing between the support and the heatsink.

In other words, in the advantageous scenario in which the canals are formed by said sockets, the fins extend largely transversely beyond toward the outside of the exterior wall of the sockets. Such an extension of the fins allows them to fold over against the exterior wall of the sockets, as a result of their being plugged into the housings.

According to one embodiment, the sealing member comprises elastomer masses arranged respectively at least in part inside the canals and each equipped with one said opening. The elastomer masses are preferably respectively arranged at the distal openings of the canals, to simplify the layout of the sealing elements in the context of the aforementioned sharing of sealing means in common.

Such elastomer masses are thus interposed between the connectors and the canals in order to prevent the passage of any moisture coming from the motor. The elastomer masses closely grip the connectors as a result of their being inserted into the canals, and may advantageously be of significant longitudinal expanse along the canals in order to best afford the sealing between the connectors and the support.

The elastomer masses may be incorporated into the support by sealing after they have been obtained by molding. However, the proposed conditions for obtaining sealing at least between the support and the connectors, but also between the support and the heatsink, advantageously makes it possible for them to be overmolded on the support inside the canals. Thus, the elastomer masses are preferably incorporated into the support by overmolding inside the canals.

The sealing elements may advantageously be derived from the elastomer masses. At least one sealing element is provided but it will be appreciated that a plurality of elements, notably in the form of fins, may be arranged in succession along each of these elastomer masses. More specifically, the fins may advantageously be incorporated by molding into the elastomer masses.

For preference, each of the elastomer masses comprises at least one lip formed inside the opening. Said at least one lip is placed in the path of the connector inserted into the canal. Because of its typical flexibility, the lip moves aside under the effect of the pressure applied on it by the connector as a result of it being introduced into the canal. The lip is therefore displaced by the connector toward the internal wall of the elastomer mass.

In this way, the elastomer mass is spared any damage by the connector. Sealing between the connectors and the support is afforded by the compression of the connector between the opposite edges of the lip. The lip thus finds itself compressed between the connector and the wall of the elastomer mass.

Furthermore, because the ability of the elastomer mass to expand transversely is constrained by the wall of the support forming the canal, the connector is gripped all the more tightly by the sealing member as a result of it being compressed between the opposite edges of the lip.

In this context, the sealing elements are advantageously respectively formed in the transverse continuation of the distal lips of the elastomer masses arranged at the distal opening of the canals. The sealing elements and the distal lips thus form a one same elastomer body.

The sealing elements are incorporated by molding into the distal lips, extending substantially in the one same plane orthogonal to the extension of the canals. Of course, the extension of the sealing elements orthogonally to the extension of the canals is considered at least prior to the mounting between the support and the heatsink.

According to one particular embodiment, the sealing member comprises an elastomer member extending interposed between the opposing faces of the support and of the heatsink. The extent of the elastomer member is potentially restricted, without necessarily needing to extend along the entirety of the opposing faces of the support and of the heatsink.

It is proposed for the elastomer member to be incorporated into the elastomer masses, connecting these together. The elastomer member may extend at least partially along the opposing faces of the support and of the heatsink.

In order to allow the elastomer member to extend between the elastomer masses, the sockets comprise lateral openings or lateral recesses formed through their respective walls. Such openings or recesses create passages for the elastomer member engaged on the elastomer masses.

In this context, the sealing member is made up of a one piece elastomer body attached to the support by sealing or more advantageously by overmolding. The one piece body is made up of at least elastomer masses and sealing elements, or possibly also where appropriate, of the elastomer member.

It should be noted that, according to one advantageous embodiment, each of the elastomer masses comprises at least one chamber formed between the distal lip and an upstream lip which are arranged at a longitudinal distance from one another along the canal. Such a chamber constitutes a member that prevents the ingress of moisture through a capillary effect from one of said lips to the other inside the canal. Such an ingress of moisture by capillary action carries the risk in fact of allowing moisture to pass toward the control board.

The chamber forms a space accommodating the displacement by the connector of the upstream lip placed in the path of insertion of the connector into the elastomer mass, upstream of the distal lip. The distance separating the distal lip and the upstream lip places the displaced upstream lip a longitudinal distance away from the distal lip, a space being left between them.

Moreover, at least the terminal part of each of the connectors advantageously comprises a peripheral body forming an interface via which the elastomer masses can grip the connectors. Such a peripheral body causes the connectors to be gripped by the elastomer mass, avoiding damage to this mass as a result of the cutting nature of the metal blade that essentially forms the connector.

The bodies are notably made of plastic, preferably thermoset, and are advantageously formed by overmolding around the connectors. Furthermore, the bodies advantageously form members that stiffen the connectors against deformation in the direction in which their terminal part extends.

The connector stiffening afforded by the bodies makes it possible to limit or even avoid deformation thereof. Remember that potential deformation is liable to affect the suitable positioning of the connectors with respect to the support and therefore makes it possible for the elastomer masses to become damaged by the connectors.

It should be noted that according to a given transverse orientation in which the openings extend, the distance separating two opposite edges of the lips for which each of the openings is equipped is notably less than the thickness of the body and preferably greater than the thickness of the distal end of the connectors. Free passage by the distal ends of the connectors through the openings is therefore afforded, as the transverse dimension of the distal ends of the connectors can then be significantly less than that of said openings. In this way, the elastomer masses are spared any damage from the connectors as a result of their passing through the openings.

Exemplary embodiments of the invention will now be described with reference to the figures of the attached plates, in which.

It should first of all be noted that the figures set forth the present invention in detail and according to particular ways of implementing it, and that said figures may of course serve if need be to better define the present invention, both in terms of its specifics and in general.

Figure 1:
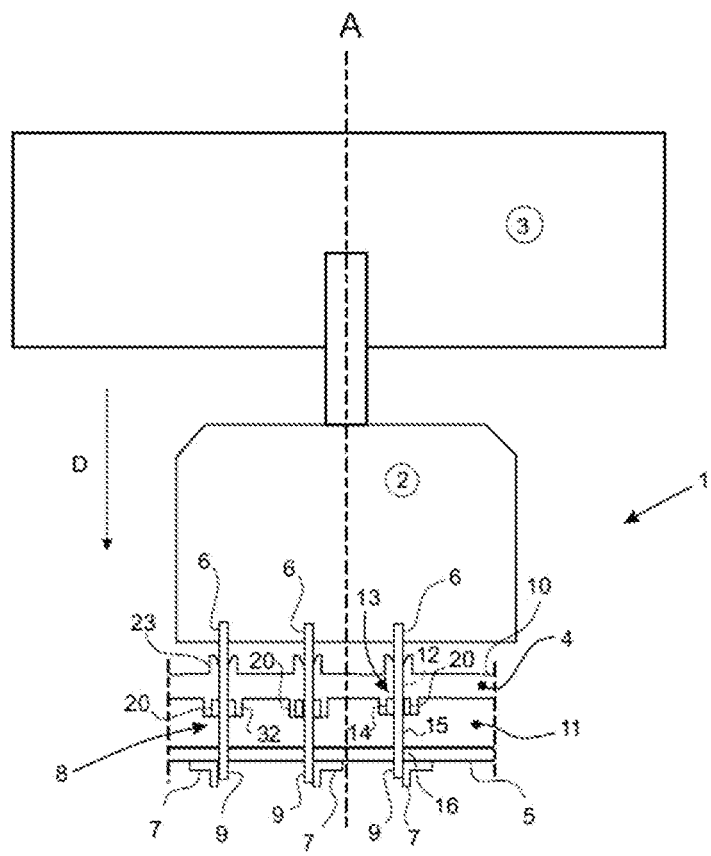
FIG. 1 is a schematic depiction in axial section of a first exemplary embodiment of an air blowing device according to the present invention.

In FIG. 1, an air blowing device 1 is dedicated to generating a flow of air inside a duct of a motor vehicle heating, ventilation and/or air conditioning installation. The air blowing device 1 comprises a motor 2 driving a fan wheel 3, a support 4 for the motor 2, and a control board 5 controlling the operation of the motor 2.

The motor 2 is notably an electronically commutated electric motor, the rotor of which drives the rotation of the fan wheel 3 and the stator of which is equipped with connectors 6 for electrically powering the stator coils. More specifically, a device for electrical connection between the motor 2 and the control board 4 comprises connectors 6 assigned to the motor 2 and flexible contactors 7 mounted on the control board 4. When a connector 6 and a contactor 7 are brought together in pairs, the electrical connection between the motor 2 and the control board 4 is established.

The connectors 6, of which there are three in the exemplary embodiments illustrated, are each formed by a metal blade. The connectors 6 comprise an elongate terminal part 8 of which the distal end 9 is designed to be placed in contact with a contactor 7 of the control board 5 assigned to it. The control board 5 is notably formed of an electrically insulating card equipped with electronic components and provided for the electrically conducting tracks. The contactors 7 with which the control board 5 is equipped are flexible and collaborate respectively with the connectors 6 of the motor 2 to form an electric circuit connecting the motor 2 to the control board 5.

The contactors 7 are mounted on the control board 5 on the distal face thereof opposite to the proximal face thereof via which it is installed on the support 4. The control board 5 regulates the operation of the motor 2, notably by varying the electrical current with which the motor 2 is supplied with power electrical energy.

Part of the support 4 is arranged as a card 10 creating two opposite faces of the support 4, these respectively being oriented toward the control board 5 and toward the motor 2.

The control board 5 is mounted at a distal face of the support 4, the other, proximal, face of the support 4 being oriented toward the motor 2.

A heatsink 11 is preferably interposed between the control board 5 and the support 4, to cool the electronic components with which the control board 5 is equipped. The support 4 comprises through it canals 12 that form respective passages for the terminal part 8 of the connectors 6 toward the contactors 7.

The support 4 is equipped with at least one sealing member 13 to prevent the ingress of water from the motor 2 toward the control board 5. Each sealing member 13 comprises an opening 14 positioned in the continuation of one of the canals 12, in order to create through it a passage from the terminal part 8 of a connector 6 toward one of the contactors 7.

As a result of a connector 6 passing through it, the sealing member 13 grips its terminal part 8 to act as an obstacle to the passage of moisture from the motor 2 toward the control board 5. In that context, the terminal part 8 of the connectors 6 is elongate extending in a direction of extension D corresponding to the direction D of insertion of the connectors 6 into the support 4. As the result of the support 4 being brought closer to the motor 2, the connectors 6 pass in succession through the support 4 along the canals 12, then the sealing members 13 along the openings 14, and then the heatsink 11 along lanes 15 formed through it, then the control board 5 along orifices 16 formed through it. The distal ends 9 of the connectors 6 then emerge beyond the control board 5 and are brought into contact with the contactors 7 respectively assigned to them.

In FIG. 1, the connectors 6 extend parallel to the axis of rotation A of the motor 2. The terminal part 8 of the connectors 6 extends in the continuation of their proximal part intended for mounting the connectors 6 on the motor 2. Thereafter, the terminal parts 8 of the connectors 6 are inserted into the canals 12 respectively assigned to them parallel to the axis of rotation A of the motor 2, in order to cause the distal end 9 of the connectors 6 to emerge beyond the distal face of the control board 5.

Figure 2:
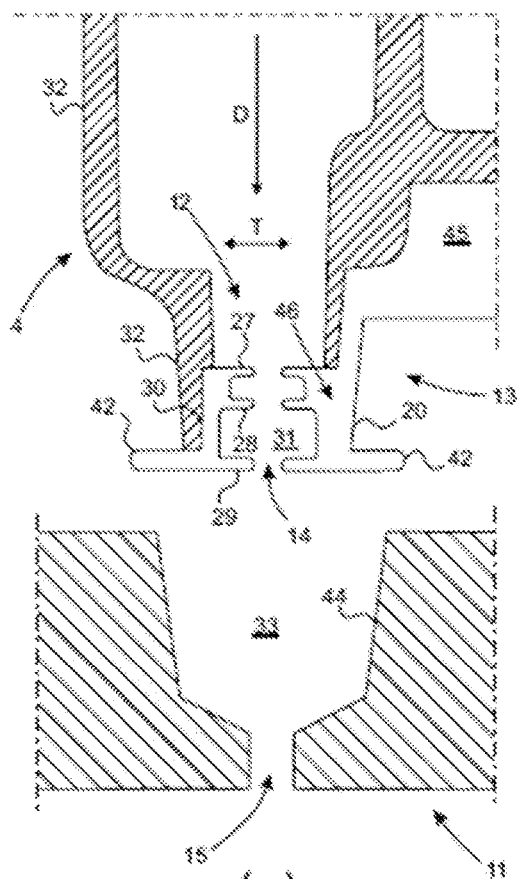
FIG. 2 is made up of two diagrams (a) and (b) which depict in axial section respectively, in the case of diagram (a) in exploded view and, in the case of diagram (b) in an assembled view, a detail of the air blowing device depicted in FIG. 1, said detail illustrating means of sealed connection between a motor support and a heatsink with which the air blowing device is equipped.
Figure 2:
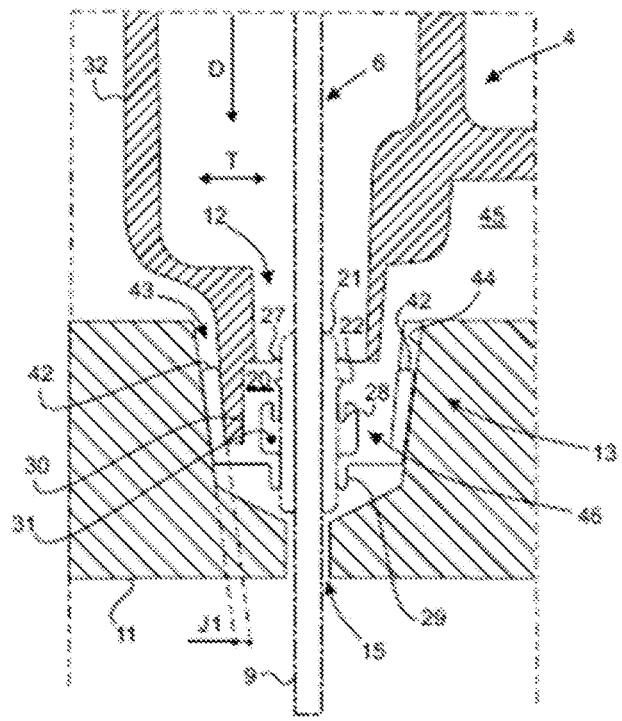

It would be conceivable, without departing from the context of the invention, for the terminal parts 8 of the connectors 6 to be oriented transversely (relative to the longitudinal-transverse orientation illustrated by the reference in FIG. 2), more specifically orthogonally to the axis of rotation A of the motor 2 if the support, and possibly the heatsink, and the control board are arranged not along the axis of the motor but transversely with respect thereto.

The relative concepts of "proximal" and "distal" are considered with respect to opposite positions oriented towards the outside of the air blowing device 1, respectively on the side of the motor 2 and on the side of the control board 5. The relative concepts of "upstream" and "downstream" are notably considered with respect to the direction D in which the connectors 6 are inserted into the canals 12 or, in other words, with respect to the direction D in which the terminal part 8 of the connectors 6 extends from the proximal part thereof which is dedicated to mounting them on the motor 2. The concepts of "lateral" and "transverse" are considered in relative terms with respect to a given orientation, such as the direction D of extension of the terminal part 8 of the connectors 6 and/or, in other words, the direction D in which the connectors 6 are inserted into the support 4 towards the contactors 7.

Diagrams (a) and (b) of FIG. 2 illustrate ways of preventing moisture from infiltrating to the control board 5, in the environment of a given connector 6. Such ways can be transposed into the respective environments of each of the connectors 6 with which the motor 2 is equipped and which each pass in succession through the support 4, the sealing member 13 and the heatsink 11 to extend from the motor 2 toward the contactors 7. The sealing member 13 affords not only sealing between the connectors 6 and the support 4 but also between the support 4 and the heatsink 11. The sealing member 13 thus acts as an obstacle against the ingress of moisture on the one hand into the canal 12 from the motor 2 and, on the other hand, into the lane 15 from the support 4.

The sealing members 13 each consist in an elastomer mass 20 arranged inside one of the canals 12 formed through the support 4, notably at the distal opening thereof. Such elastomer masses 20 have passing through them the connectors 6 which extend through their opening 14, in order to afford sealing between the support 4 and the connectors 6. The elastomer masses 20 therefore grip the connectors 6, thus forming a barrier against the ingress of moisture along the canals 12 toward the control board 5.

Figure 4:
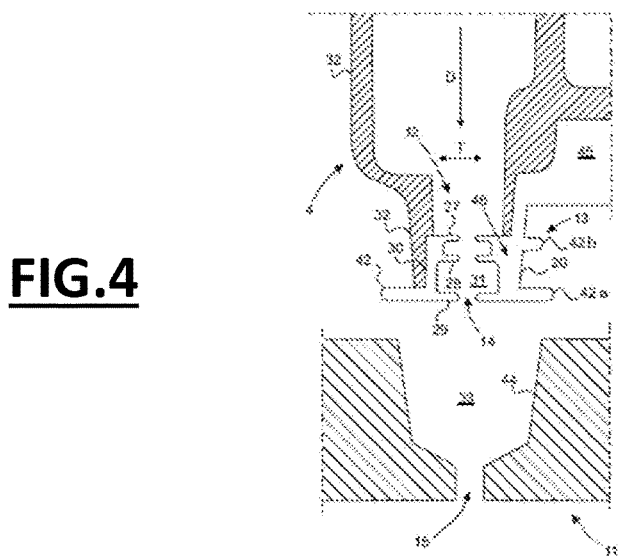
FIG. 4 is an illustration similar to that of FIG. 2 (*a*) of an alternative form of embodiment of the invention.

The sealing member 13 also comprises sealing elements 42 extending as a radial projection from the elastomer mass 20 so as to be interposed between the support 4 and the heatsink 11. The sealing elements 42 make it possible to prevent the ingress of moisture from the support 4 toward the lanes 15 passing through the heatsink 11. As depicted, at least one first given sealing element 42a is formed at the distal opening of a canal 12 assigned to it. The first sealing element 42a is arranged like a fin extending toward the outside of the canal 12 transversely (in the direction of the arrow T visible in FIG. 2) with respect to the direction D in which the connector 6 is inserted into the canal 12. It will be appreciated that the sealing elements 42 may further comprise at least one second sealing element 42b (in the embodiment illustrated in FIG. 4) which extends substantially parallel to the first sealing element 42a, at a distance therefrom so as to allow one or other of the sealing elements 42 to bend over against the external wall of the elastomer mass. Thus there are sealing elements 42 formed by successive fins in the direction D in which the connectors are inserted.

Moreover, the heatsink 11 comprises housings 33 opening onto the proximal face of the heatsink 11, which face is oriented towards the distal face of the support 4.

The bottom of the housings 33 is open, to form the lane 15 creating the passage for the connector 6 through the heatsink 11. Each housing 33 has plugged into it a socket 32 formed on the support 4 to project from the distal face thereof, the socket 32 extending in the direction D in which the connector 6 is inserted through the support 4. A transverse clearance J1 (visible in diagram (b) of FIG. 2) is formed between the housing 33 and the socket 32, so as to create between these a gap 43 when they are plugged one into the other. The gap 43 forms a space to accept the sealing element 42 as a result of the socket 32 being plugged into the housing 33 in the direction D in which the connector 6 is inserted into the canal 12 or, in other words, in the longitudinal direction D in which the socket 32 extends as a projection toward the heatsink 11. It will be appreciated that, in an alternative form of embodiment which has not been depicted As illustrated in diagram (b), the insertion of the socket 32 into the housing 33 causes the sealing element 42 to fold over in a direction substantially the opposite of the longitudinal direction D in which the socket 32 extends as a projection toward the heatsink 11. The sealing element 42 is folded over toward the inside of the housing 33, being placed in transverse compression between the wall of the heatsink 11 delimiting the housing 33 and the wall of the socket 32. A barrier is thus created against the ingress of moisture from the support 4 toward the lane 15 passing through the heatsink 11. The housing 33 widens toward its proximal opening oriented toward the support 4, in order to create along the walls of the housing 33 a ramp 44 where the sealing element 42 is progressively compressed. In an alternative form of embodiment not depicted, provision could be made for the ramp-forming wall 44 to be provided with successive lips as may have been defined in the elastomer masses. It would be appreciated that, in order for the radial end of the sealing element 42 to be deformed as it is inserted into the housing 33, the sealing element needs to extend transversely over a dimension that is greater than the transverse dimension of the housing 33 at its widened proximal opening. Thus, compression of the sealing element 42 between the housing 33 and the socket 32 is assured and effectively does afford the sealing between the support 4 and the heatsink 11.

It will also be noted that the plugging of the various sockets 32 into the housings 33 assigned to them thus remain flexible couplings. Such flexible couplings allow the sockets 32 to be individually centered in the housings 33, assuring the sealing obtained by means of each of the sealing elements 42, and doing so despite the collectively high number of sockets 32 centered in housings 33 assigned to them.

The sealing element 42 derives from the elastomer mass 20 with which the sealing element 42 forms a one-piece assembly. More particularly, the first sealing element 42a and a distal lip 29 of the elastomer mass 20 are incorporated into one another as the one same elastomer body. The first sealing element 42 transversely prolongs the distal lip 29 toward the outside of the canal 12, said elastomer body being incorporated into the elastomer mass 20 at its distal end. It will be noted that the one-piece design of the elastomer mass 20 is able to afford the two-fold sealing required between the connector 6 and the support 4 on the one hand, and between the support 4 and the heatsink 11 on the other.

Incorporating the sealing element 42 into the elastomer mass 20 thus allows the elastomer mass 20 to be organized with a one-piece design that allows it to be obtained by individual molding, preferably by overmolding it on the support 4. The opening 14 formed through the sealing member 13 allows the connector 6 to pass through the distal lip 29 of the elastomer mass 20.

Moreover, it is possible to provide an elastomer member 45 extending such that it is interposed between the opposing faces of the support 4 and of the heatsink 11 and forming a connecting member joining together the elastomer masses 20 with which the elastomer member 45 forms a one-piece sealing assembly. Thus, particularly in cases in which this sealing assembly 13 is individually molded and then attached to the support 4, for example by bending, the plurality of elastomer masses 20 of this sealing assembly 13 may be handled by an operator as a single unit. In order to allow the elastomer member 45 to pass from one of an elastomer masses 20 to another, the socket 32 comprises a lateral recess 46 formed through the wall of the socket 32 at the distal end thereof. The elastomer mass 20 spills transversely out of the socket 32 through the recess 46. Thus, the elastomer member 45 can extend unimpeded between the various elastomer masses 20 which it joins together.

The elastomer masses 20 preferably comprise a plurality of lips 27, 28, 29 formed transversely inside the opening 14. In the exemplary embodiment illustrated in the diagrams of FIG. 3, the lips 27, 28, 29 are three in number and are arranged at longitudinal distances from one another along the opening 14. A proximal lip 27 is formed at the proximal mouth of the opening 14. An intermediate lip 28 is interposed between the proximal lip 27 and the distal lip 29 in the direction in which the opening 14 extends longitudinally. Thus, the connector 6 passes in succession through the proximal lip 27, the intermediate lip 28 and the distal lip 29, as it extends along the opening 14.

Figure 3:
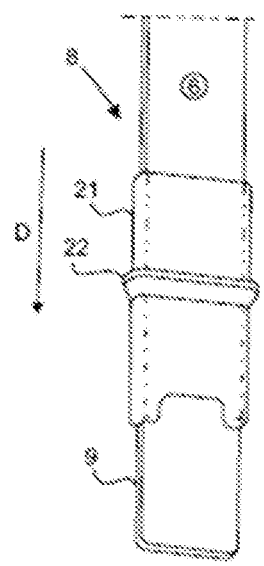
FIG. 3 is a partial perspective illustration of a connector forming part of the device for the electrical connection between a motor and a control board with which the air blowing device depicted in FIG. 1 is equipped.

In FIG. 3, the terminal part 8 of the connector 6 is provided with a body 21 advantageously attached by overmolding around a region of the connector 6 that is intended to be clamped by the sealing member 13. The body 21 is notably made from a thermoset, affording the connector 6 stiffness against deforming.

In this context and with reference to FIG. 2, the thickness of the body 21 is significantly greater than the thickness of the distal end 9 of the connector 6. Furthermore, the body 21 comprises at its periphery a bulge 22 for jamming the terminal part 8 of the connector 6 inside the sealing member 13, as illustrated in diagram (b) of FIG. 2. As has just been described, the body 21 forms an interface at which the connector 6 is clamped by the elastomer mass 20. The thickness of the body 21 is greater than the distance separating, in the direction D, two opposite edges of the lips 27, 28, 29. Furthermore, the thickness of the distal end 9 of the connector 6 is significantly smaller than this distance separating two opposite edges of the lips 27, 28, 29.

It will be noted that the distance separating two opposite edges of the lips 27, 28, 29 is preferably similar for all of the lips. However, it will be appreciated that the distance D3 separating two opposite edges of any particular lip 27, 28, 29 may potentially be different than that of any other particular lip.

As a result of the connector 6 being inserted into the opening 14 as illustrated in diagram (b) of FIG. 2, the distal end 9 of the connector is able to be inserted into the opening 14 without the risk of damaging the lips 27, 28, 29. The body 21 pushes back the lips 27, 28, 29 in turn and these because of their flexibility move aside, allowing the connector 6 to pass through the opening 14. Because of its shaping, the fact that it is formed by molding and/or the material of which it is made, the body 21 is not sharp-edged. That being so, the body is not damaging to the lips 27, 28, 29 as it pushes them aside. The lips 27, 28, 29 are therefore placed such that they are interposed between the wall of the opening 14 and the body 21.

The elastomer mass 20 is housed in a cavity 30 of the support 4 which cavity is formed at the distal mouth of the canal 12. The elastomer mass is thus held in shape inside the canal, notably transversely, even when the connector 6 is passing through it. Because of the lips 27, 28, 29 being interposed between the body 21 and the support 4, the lips are compressed by the body 21 with the effect of affording an effective seal between the support 4 and the connector 6. The connector 6 is firmly clamped by the elastomer mass 20 as a result of the transverse compression T of the body 21 inside the opening 14. The elastomer mass 20 comprises a chamber 31 arranged longitudinally L between the intermediate lip 28 and the distal lip 29 in compression. Deformation of the intermediate lip 28 causes it to move aside against the wall of the opening 14, extending longitudinally L some distance from the distal lip 29. The chamber 31 thus forms an obstacle to the ingress through capillary action of any moisture that might be present from the intermediate lip 28 toward the distal lip 29.

The invention claimed is:

1. An air blowing device comprising:
   a support on which are installed an electric motor and an electronic control board regulating the operation of the motor,
   the motor being equipped with at least one elongate connector a terminal part of which passes through the support along a canal so that the distal end of said connector collaborates with a contactor with which the control board is equipped,
   wherein the support is equipped with at least one sealing member individually clamping the terminal part of the connector passing through the sealing member along an opening formed in the continuation of the canal,
   a heatsink moreover being interposed between the support and the control board and comprising at least one lane for the passage of said connector therethrough,
   said lane being arranged in the continuation of said canal,
   wherein the sealing member comprises sealing elements interposed between the support and the heatsink in the output transverse continuation of said canal, and
   wherein the heatsink comprises at least one housing to accept a socket incorporated into the support and projecting toward the control board, the opening of said socket forming said canal.

2. The air blowing device as claimed in claim 1, wherein the sealing elements comprise at least one first sealing element formed at the distal open end of said canal and oriented toward the heatsink and provided with one said opening.

3. The air blowing device as claimed in claim 1, wherein the bottom of the housing is open to the distal face of the heatsink oriented toward the control board, forming said lane.

4. The air blowing device as claimed in claim 1, wherein the sealing elements are interposed in compression between the exterior wall of the socket and the wall of the heatsink delimiting the housing.

5. The air blowing device as claimed in claim 1, wherein the housing widens toward its proximal opening oriented toward the support, forming ramps that progressively compress the sealing elements between the exterior wall of the socket and the wall of the heatsink delimiting the housing.

6. The air blowing device as claimed in claim 1, wherein the sealing elements are arranged as fins derived from an elastomer material and extending toward the outside of the canal transversely to the direction of insertion of the connector into the canal.

7. The air blowing device as claimed in claim 1, wherein several elastomer masses forming the sealing member are respectively arranged at least in part inside canals and are each equipped with one said opening.

8. The air blowing device as claimed in claim 7, wherein the elastomer masses are respectively arranged at the distal openings of the canals.

9. The air blowing device as claimed in claim 7, wherein the elastomer masses are incorporated into the support by overmolding inside the canals.

10. The air blowing device as claimed in claim 7, wherein the sealing elements are derived from the elastomer masses.

11. The air blowing device as claimed in claim 7, wherein each of the elastomer masses comprises at least one lip formed inside the opening.

12. The air blowing device as claimed in claim 11, wherein the sealing elements are formed respectively in the transverse continuation of distal lips of the elastomer masses arranged at the distal opening of the canals.

13. The air blowing device as claimed in claim 7, wherein the sealing member comprises an elastomer member extending as an interposition between the opposing faces of the support and of the heatsink.

14. The air blowing device as claimed in claim 13, wherein the elastomer member is incorporated into the elastomer masses, joining these together along the opposing faces of the support and of the heatsink.

15. The air blowing device as claimed in claim 7, wherein the sealing member is made up of a one-piece elastomer body attached to the support and made up at least of the elastomer masses and of the sealing elements.

16. A motor vehicle heating, ventilation and/or air conditioning system comprising at least one air blowing device as claimed in claim 1.

17. An air blowing device comprising:
  a support on which are installed an electric motor and an electronic control board regulating the operation of the motor,
  the motor being equipped with at least one elongate connector a terminal part of which passes through the support along a canal so that the distal end of said connector collaborates with a contactor with which the control board is equipped,
  wherein the support is equipped with at least one sealing member individually clamping the terminal part of the connector passing through the sealing member along an opening formed in the continuation of the canal,
  a heatsink moreover being interposed between the support and the control board and comprising at least one lane for the passage of said connector therethrough,
  said lane being arranged in the continuation of said canal,
  wherein the sealing member comprises sealing elements interposed between the support and the heatsink in the output transverse continuation of said canal,
  wherein several elastomer masses forming the sealing member are respectively arranged at least in part inside canals and are each equipped with one said opening,
  wherein the elastomer member is incorporated into the elastomer masses, joining these together along the opposing faces of the support and of the heatsink, and
  wherein said socket comprises a lateral recess, formed through its wall, the recess forming a passage for the elastomer member engaged on an elastomer mass.

\* \* \* \* \*